Feb. 24, 1942.   R. D. BARRY   2,274,396
DIAL CLEARING MEANS FOR METERS
Filed Feb. 24, 1941
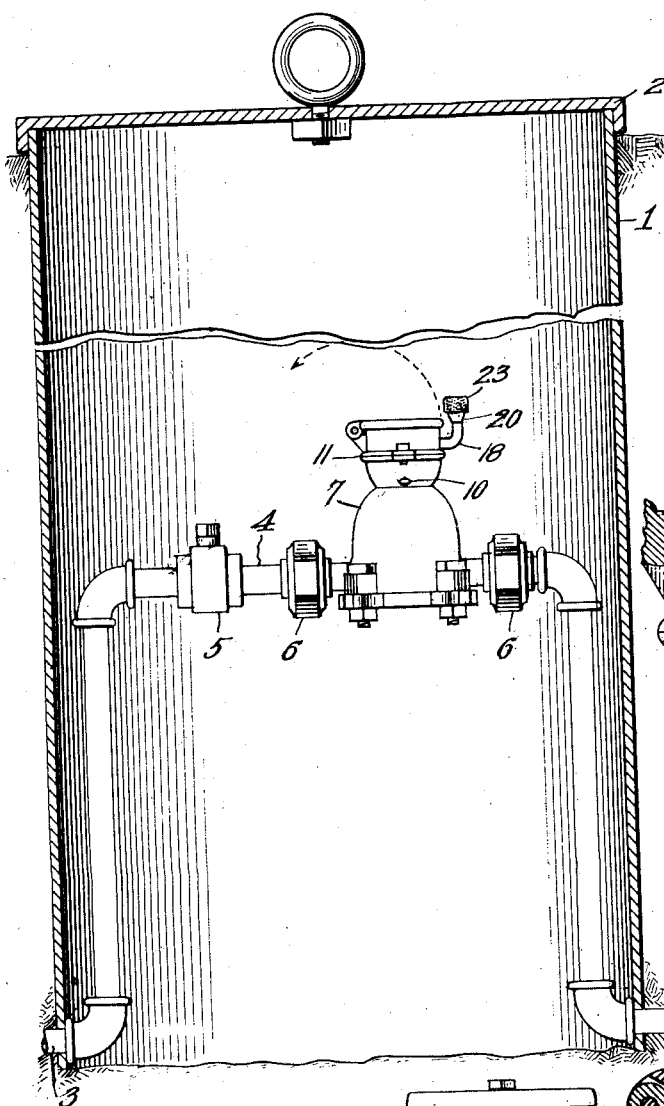
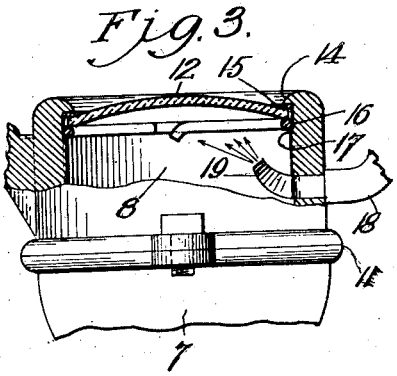
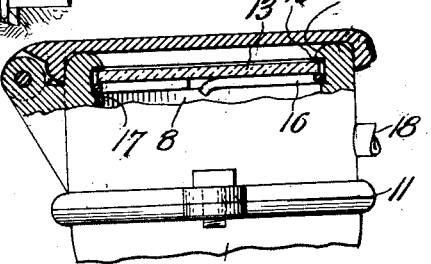
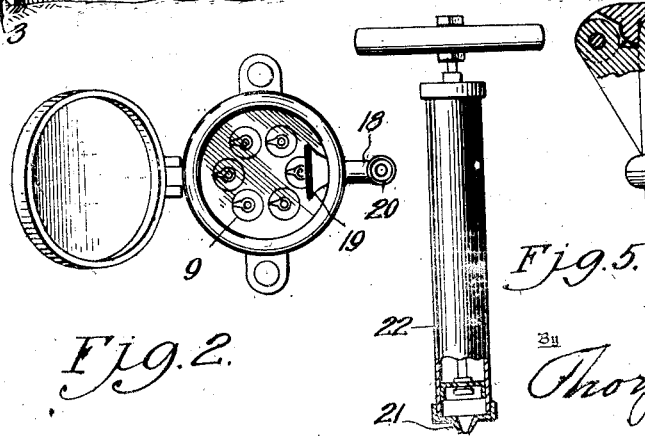
Inventor
Robert D. Barry
By Thorpe & Thorpe
Attorneys Patented Feb. 24, 1942

2,274,396

UNITED STATES PATENT OFFICE 2,274,396

DIAL CLEARING MEANS FOR METERS

Robert D. Barry, Grandview, Mo.

Application February 24, 1941, Serial No. 380,165

2 Claims. (Class 73—151)

This invention relates to fluid meters and particularly to water meters such as are frequently mounted in pits or boxes and similar locations subject to fluctuating moisture and temperature differentials. The housing for the dial or indicator compartments of such meter is customarily made relatively dirt tight, but they are not air nor water tight, and temperature and moisture changes cause condensation on the inner face of the windows covering the dials. Excessive condensation is drained through suitable drain or vent openings below the dial chamber, or through the joints in the housing parts, but some water will frequently adhere in bubbles to the underside of the window and will refract or obstruct the vision to such degree as to make impossible the accurate reading of the meter. Meter readers usually violently jar the meters in an endeavor to dislodge the condensation, but this remedy is not always effective and sometimes leads to the damage of the meter.

The object of the invention, therefore, is to provide a combination of meter and self-clearing window for draining water condensed on the glass to the side wall of the dial chamber. Another object of the invention is to provide a construction of the character indicated, in which means are provided for the application of an air jet for the blowing or driving of the condensate from the underside of the window to clear the dials.

With the general objects named in view and others as will hereinafter appear, the invention consists in certain novel and useful features of construction and combination of parts as hereinafter described and claimed; and in order that it may be fully understood, reference is to be had to the accompanying drawing, in which:

Figure 1 is a vertical section through a meter pit in which a meter embodying the invention is mounted.

Figure 2 is a top plan view of the meter with the protector caps for the dial face and for the air conduit removed from position.

Figure 3 is an enlarged section of the dial housing in which a window is shown having self-clearing properties as far as condensate is concerned.

Figure 4 is a view similar to that of Figure 3, but the housing cap is shown in closed position and shows a plano window.

Figure 5 is a side elevation, partially broken away, of a convenient form of pump for applying a jet of air to the underside of the window.

In the said drawing, where like reference characters identify corresponding parts in all of the figures, reference will be made, by way of example, to one form of meter pit now in common use, in which: 1 is a vitrified tile equipped with a removable cover 2. The water pipe 3 extending through the pit, is preferably provided with an inverted U-section 4 carrying a shut-off valve 5, and a pair of unions 6, between which a fluid meter 7 is mounted. The upper end of the meter housing is formed with a chamber 8 in which dials and indicating hands 9 are displayed in horizontal position (Figure 2), and said chamber is connected by a conduit opening at 10 through the outer wall (Figure 1), through which condensation within the dial chamber may be discharged, or such discharge may occur through the joint 11 between the upper and lower meter housing sections.

The upper end of the dial housing 8 is open and, in the preferred construction, is covered by a transparent glass or plastic window, which may be either concave on its inner face as shown at 12, in Figure 3, or may be plano as shown at 13, in Figure 4, the former being preferred. The concave or inclined type of window 12, is found to be, to a large measure, self-clearing since the inclination of its inner face causes the gravitative deposition of condensation on the inner wall of the housing, and the glass remains relatively clear, except at times. In both constructions, an inwardly extending flange 14 surrounds the window opening to hold the window 12—13 against outward movement, a gasket 15 being inserted between the window and the flange 14. The above assembly is held in position by means of a split ring 16 which fits just above a peripheral shoulder 17 projecting from the inner wall of the housing 8.

In cases where the plano glass 13 is used, or when the concave glass 12 does not properly clear itself of condensation, it has been found preferable to tap the side wall of the dial housing 8 and insert a discharge tube or elbow conduit 18, having its discharge end equipped with an upwardly flared or fish tail nozzle 19 to discharge in a plane above the indicator hands of the meter against the window in a widely distributed jet. This air blast forces condensation off the glass into contact with the side wall of the housing down which it will gradually drain.

By preference the inlet end of the conduit 18 is formed with a conical seat 20 to receive a corresponding projection 21 on the lower end of a small portable air pump 22. When the conduit is not in use, its inlet end should be closed in any suitable way, as by a rubber closure cap 23. From the above description, it will be apparent that I have produced a construction embodying all of the features of advantage set forth as desirable, and while I have described and illustrated the preferred embodiment, it is to be understood that I reserve the right to all changes within the spirit and scope of the appended claims.

I claim:

1. The combination in a meter having a chamber closed at one end by a transparent plate and at its other end by a dial to be read through said plate, of a conduit extending through the side wall of the chamber and a jet opening on the conduit within the chamber and directed to discharge against the inner face of the transparent plate, the outer end of the conduit extending upwardly and terminating in a seat adapted for quick-detachable engagement with a compressed air supply source.

2. The combination in a meter having a chamber closed at one end by a transparent plate and at its other end by a dial to be read through said plate, of a conduit extending through the side wall of the chamber, a jet opening on the conduit within the chamber and directed to discharge against the inner face of the transparent plate, the outer end of the conduit extending upwardly and terminating in a seat adapted for quick-detachable engagement with a compressed air supply source, and a removable cap closing the upper end of said conduit.

ROBERT D. BARRY.